United States Patent [19]
Doyle et al.

[11] 3,779,174
[45] Dec. 18, 1973

[54] BULKHEAD

[76] Inventors: William F. Doyle, 2818 McAlister St., Topeka, Kans. 66614; Charles W. Artzer, 631 Freeman St., Topeka, Kans. 66616

[22] Filed: Aug. 25, 1972

[21] Appl. No.: 283,765

[52] U.S. Cl.............. 105/376, 105/369 B, 105/374
[51] Int. Cl............................................. B60p 7/14
[58] Field of Search..................... 105/368 S, 369 B, 105/374, 376; 296/28 R, 28 M

[56] References Cited
UNITED STATES PATENTS

| | | | |
|---|---|---|---|
| 2,819,688 | 1/1958 | Hall | 105/374 |
| 2,826,156 | 3/1958 | Hall | 105/376 |
| 2,972,490 | 2/1961 | Styx | 105/376 |
| 2,978,993 | 4/1961 | Hall | 105/374 |
| 3,054,363 | 9/1962 | Baker | 105/368 S |
| 3,193,122 | 7/1965 | Sauthoff | 105/376 |
| 3,451,357 | 6/1969 | Barnard et al. | 105/376 |
| 3,583,333 | 6/1971 | Matyas | 105/376 |

Primary Examiner—Drayton E. Hoffman
Attorney—Richard K. Stevens et al.

[57] ABSTRACT

A bulkhead for use on vehicles having an open flat cargo carrying surface and stake pockets has a retaining panel attached to the bed of the vehicle with a rack carried by the panel and a comb structure which is secured in the stake pockets. The rack and comb are secured together with a plurality of longitudinally spaced pegs and holes which permit longitudinal positioning of the bulkhead against the cargo. A bracket having a slot of two different cross-sections is provided on the bulkhead to cooperate with a chain to secure the bulkhead to the vehicle against relative vertical movements.

11 Claims, 4 Drawing Figures

BULKHEAD

This invention relates generally to cargo carrying vehicles and more particularly to bulkheads for such vehicles and to vehicles provided with the bulkheads.

It is the practice to haul various kinds of cargo which do not require the protection of an enclosure on highway trailers and railway cars which have an open flat load carrying surface. Such trailers and cars are provided with stake pockets and are easily loaded with heavy cargo such as coiled steel, metal rods, metal sheets, pipes, castings and the like because there are no side walls or top to interfere with loading equipment. Cargo of the aforesaid kind is most often transported today on highway trailers. If the cargo is to be transported a great distance the most popular practice is to place the cargo on a trailer, transfer the loaded trailer to a railway flat car at the nearest railway freight yard and to transport the trailer and its load the greater part of the distance to its destination "piggy-back" on the railway car.

The trailer is secured against relative movement on the flat car with its surface substantially parallel to the underlying surface of the car but it has been found that in spite of this precaution the cargo sometimes shifts upon rapid acceleration or deceleration of a train. In fact, there have been instances where loads of steel have fallen from the trailer across the rails and caused derailments. Various kinds of bulkheads have been disclosed for railway flat cars but none of these has been adopted for trailers in "piggy-back" service probably because they cannot be moved longitudinally on the car's surface to accomodate variations in the dimensions of the cargo or they are so complicated mechanically that their use would be expensive and impractical.

It is therefore an object of this invention to provide a bulkhead for vehicles having a flat open cargo carrying surface which is devoid of the foregoing disadvantages. Another object of the invention is to provide a removable bulkhead which is particularly well suited for use on a highway trailer but can also be used to advantage on other flat bedded freight vehicles which are provided with stake pockets along the side of the cargo bearing surface. A more specific object of the invention is to provide a bulkhead for open flat bed trailers or the like of relatively simple construction which can be moved easily to accommodate cargo of any size or shape. A still further object of the invention is to provide a freight vehicle having an open flat loading surface and stake pockets with an improved removable bulkhead attached thereto.

Other objects will become apparent from the following description with reference to the accompanying drawing wherein FIG. 1 is a side elevation of a trailer with one embodiment of the bulkhead of the present invention mounted thereon;

The foregoing objects and others are accomplished in accordance with this invention, generally speaking, by providing a bulkhead having a retaining panel which may be secured at each end to the cargo carrying surface of a vehicle by a longitudinally adjustable rack and comb assembly. The rack is secured to the ends of the retaining panel and has an elongated base member secured to the wall with its longitudinal axis substantially perpendicular to the axis of the retaining panel. The length of the retaining panel and rack assembly is substantially equal to the width of the vehicle's cargo carrying surface. Preferably, braces are secured at one end to the base member and at the other end to opposite sides of the retaining panel to strengthen the structure. The angle enclosed between the brace and the base member is an acute angle and usually the brace is fixedly secured to the retaining panel below the top edge thereof.

The rack is combined with a comb structure to secure the retaining panel from moving under load longitudinally or laterally over the load bearing surface. This comb structure has an elongated base plate with at least two depending legs secured thereto and adapted to be disposed in longitudinally spaced stake pockets along the side of the vehicle bed to secure the plate against relative longitudinal or lateral movement. In a preferred embodiment, a plurality of longitudinally spaced upstanding pegs, usually eight, are secured to the plate. Similarly spaced holes are provided in the rack's base member and the rack and comb are joined together by placing the rack over the comb with one or more pegs extending through a hole in the base member. If desired, the pegs can be carried by the base member and matching holes may be provided in the base plate of the comb but this arrangement requires a plate member sufficiently thick to provide holes for enclosing the pegs or holes in the vehicle bed.

The bulkhead may be secured to the vehicle against relative vertical movement with a chain. A bracket is secured to each end of the bulkhead at a point vertically spaced above the rack's base. This bracket has a slot having an upper portion adapted to enclose closely a chain link disposed substantially horizontally therein and a lower portion of less cross-section and adapted to closely enclose a chain link if it is disposed with its width extending vertically in the slot. Such a slot configuration insures that the chain can be drawn until taut and will remain that way throughout the trip.

Figure 1:
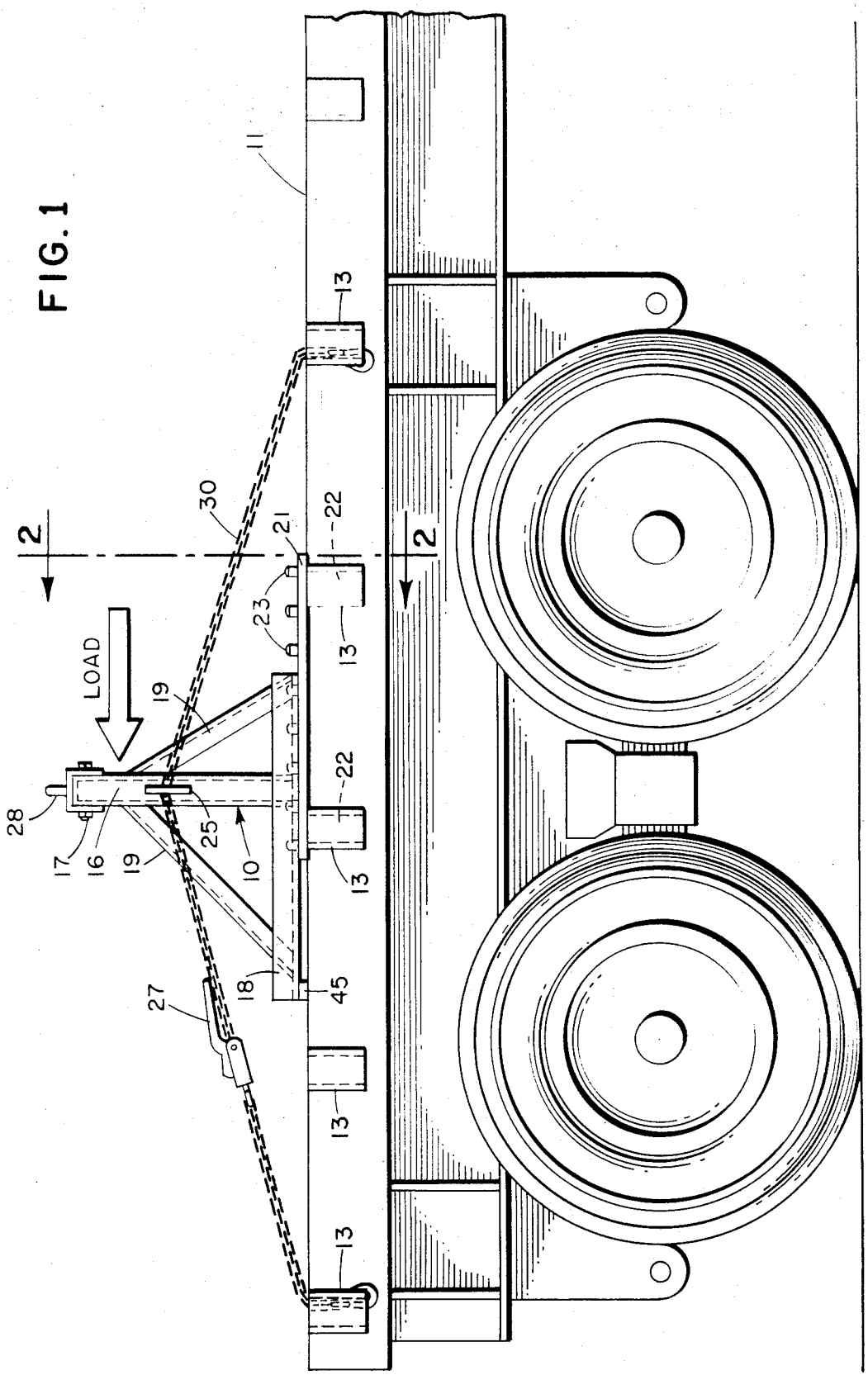
Figure 2:
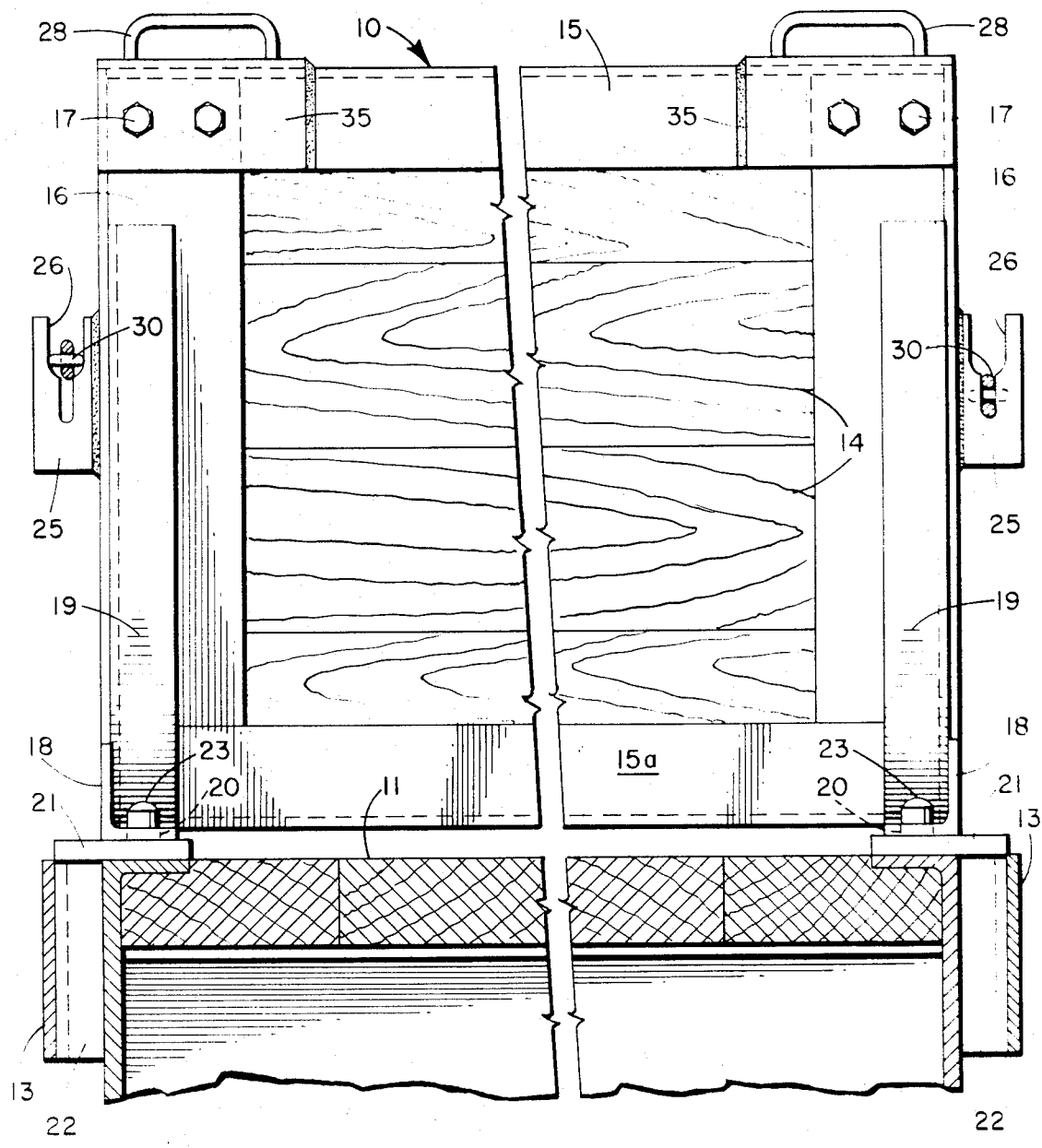
FIG. 2 is a front elevation of the bulkhead taken along line 2—2 of FIG. 1.

Referring now to the drawing, one embodiment of the invention is illustrated attached to the loading surface of a highway trailer in FIG. 1. Retaining panel 10 extends laterally across the unenclosed flat surface 11 of a conventional flat bed trailer adapted for carrying coils of metal, metal rods or the like. Longitudinally spaced stake pockets 13 are formed by a U-shaped metal plate secured to the side of the trailer bed. Upstanding retaining panel 10 illustrated in FIG. 2 is composed of a plurality of boards 14 such as conventional wood flooring joined together by tongue and groove joints. The top edge and the bottom edge of panel 10 are covered with channels 15 and 15a, respectively. An upstanding channel 16 encloses the ends of boards 14 and is secured thereto. The ends of channels 15 and 15a may be secured with bolts 17 or by welding or other means to the underlying end of channel 16 or to a plate 35 welded thereto. A rack at each end of retaining panel 10 has an angle iron longitudinally extending base member 18 below panel 10. A pair of angle iron brace members 19 are welded at one end to base member 18 and at the other end to channel member 16. The included angle between brace member 19 and base member 18 is an acute angle of about 45°.

Figures 3, 4:
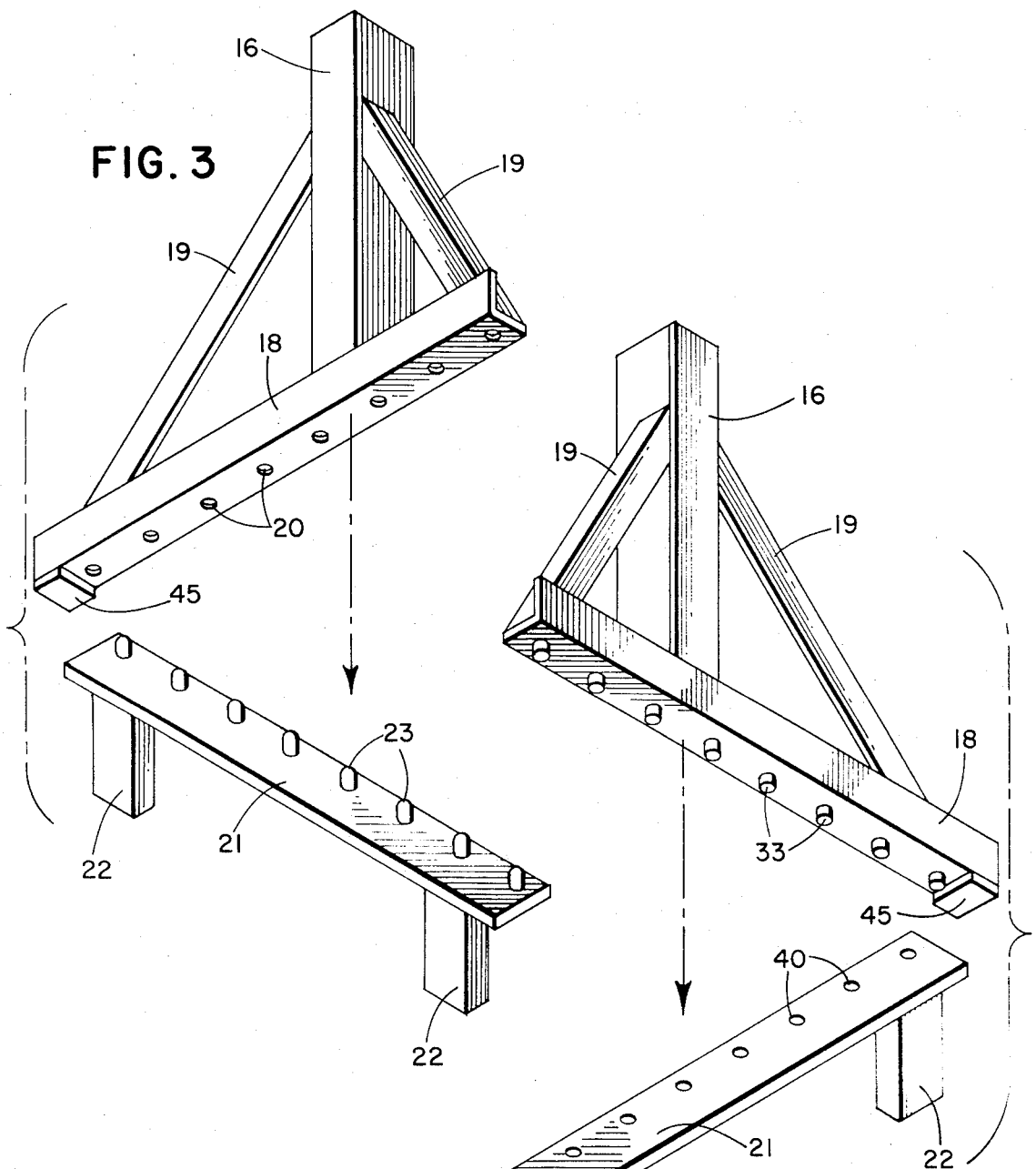
FIG. 3 is an exploded perspective of the cooperating parts of one end of the bulkhead structure.
FIG. 4 is an exploded perspective of modified parts similar to those shown in FIG. 3.

In the embodiment illustrated in FIGS. 1, 2 and 3 a plurality of holes 20 in base member 18 are spaced longitudinally. A comb structure having elongated plate member 21 with longitudinally spaced depending legs or posts 22 secured thereto and disposed in stake pockets 13 extends along the edge of the trailer bed. A plurality of upstanding pegs 23 are secured to plate member 21. Pegs 23 are spaced longitudinally the same distance apart as are holes 20. The diameter of pegs 23 is only slightly less than the diameter of holes 20 so that the pegs 23 extend through holes 20 and fit snugly therein when base member 18 or a portion thereof is disposed over plate member 21. Base member 18 may be positioned over plate member 21 so that a peg extends through each hole 20 or, if the size of the load requires, only a portion of base member 18 may be disposed over plate member 21 with only two, three or more pegs disposed in holes 20. Plate 45 welded to the bottom of base member 18 is of the same thickness as plate 21 and supports that end of base member 18 which is not disposed over plate 21. Such an arrangement permits longitudinal adjustment of the bulkhead with the size of the load carried by the vehicle even between stake pockets.

A chain 30 is secured to a stake pocket 13 spaced longitudinally from each side of retaining panel 10. Chain 30 is drawn until taut over a bracket 25 secured to channel 16. Bracket 25, as illustrated in FIG. 2, has a slot 26 of greater cross-section at the top than at the bottom. The width of the larger portion of slot 26 is only slightly larger than the width of the chain link while the lower portion of slot 26 is about equal in depth to the width of a chain link and only slightly greater in cross-section than the thickness of a chain link. Consequently, a chain link disposed vertically in the bracket will fall into the lower narrower portion of the slot 26 while a horizontally disposed link will fit snugly in the upper portion of the slot 26. A clamp 27 may be provided in the chain to avoid slack therein and to insure that the bulkhead is rigidly secured against vertical separation from the vehicle bed.

As illustrated in FIG. 4, in an alternate embodiment, pegs 33 are carried by base member 18 and matching holes 40 are provided in plate member 21.

The retaining panel 10 illustrated in the drawing is made of wood but it can be corrugated sheet metal such as aluminum or steel or any other suitable material. Channel member 15 might not be required if a metal plate is used for panel 10 and angle iron might be substituted for channels 16. As shown in the drawing a pair of handles 28 may be provided to facilitate lifting and moving the bulkhead.

The bulkhead may be attached to any vehicle having a loading surface and stake pockets. For example, it may be attached to a railway flat car to prevent shifting of lading loaded directly thereon.

The combination of the rack and comb structure for securing the retaining panel to the vehicle not only permits moving the bulkhead longitudinally from one stake pocket to another but permits close positioning of the bulkhead against the cargo between stake pockets. The bulkhead is easily attached to the vehicle and can be removed quickly when the cargo reaches its destination.

Although the invention has been described in detail for the purpose of illustration it is to be understood that such detail is solely for that purpose and that variations can be made by those skilled in the art without departing from the spirit and scope of the invention except as it may be limited by the claims.

What is claimed is:

1. A removable bulkhead adapted for attachment to the surface of a vehicle provided with stake pockets secured around the surface comprising an upstanding retaining panel adapted to extend laterally across a vehicle bed, means at each end of the panel for supporting it in an upstanding position across the bed's surface against relative movement under load and comprising an elongated base member secured to the base of the panel with its longitudinal axis substantially perpendicular to the longitudinal axis of the panel, an elongated base plate having at least two depending legs spaced longitudinally to be disposed simultaneously in stake pockets, and means for securing the base member to the base plate against relative longitudinal or lateral movement comprising a plurality of longitudinally spaced pegs carried by one and a plurality of matching holes in the other.

2. The bulkhead of claim 1 wherein the pegs are carried by the base plate and the holes are in the base member.

3. The bulkhead of claim 2 wherein a brace on each side of the retaining panel is secured at one end to the base member and at the other end to the panel and the angle enclosed between a brace member and base member is an acute angle.

4. The bulkhead of claim 3 wherein each end of the retaining panel carries a bracket having a slot therein adapted to support a chain used to secure the bulkhead against vertical movement relative to the vehicle bed.

5. The bulkhead of claim 3 wherein said retaining panel comprises a plurality of boards disposed one above the other, channel members are secured over the exposed edges of the top and bottom boards, a channel member encloses each end of the boards and the brace members are secured to the last said channel members.

6. The bulkhead of claim 1 wherein the said base member is angle iron.

7. A vehicle having a bed with a flat surface adapted to carry cargo and having longitudinally spaced stake pockets along each side thereof and a bulkhead removably attached thereto comprising an upstanding retaining panel which extends laterally across the said flat surface, and means at each end of the panel for securing it against relative movement with the bed under load comprising an elongated base member secured to the panel and disposed longitudinally along one edge of the surface, a base plate disposed between the base member and said surface having at least two longitudinally spaced legs each disposed in a stake pocket, said base member and base plate being secured against relative longitudinal and lateral movement by longitudinally spaced pegs carried by one disposed in matching holes carried by the other.

8. The vehicle of claim 7 wherein the base member has the holes and the base plate carries the pegs.

9. The vehicle of claim 8 wherein the retaining panel comprises a plurality of boards disposed edge to edge one over the other, a channel member covers the top and bottom of the panel, and a channel member covers the ends of the boards.

10. The vehicle of claim 8 wherein a pair of braces are secured at one end to the base member and at the other end to the retaining panel with the enclosed angle between each brace and the base member being acute.

11. The vehicle of claim 10 wherein said retaining panel carries a bracket having a slot therein near its upper edge on each end and a chain secured at each end to a stake pocket passes through the slot and secures the panel against vertical movement relative to the vehicle bed.

* * * * *